Figure 2:
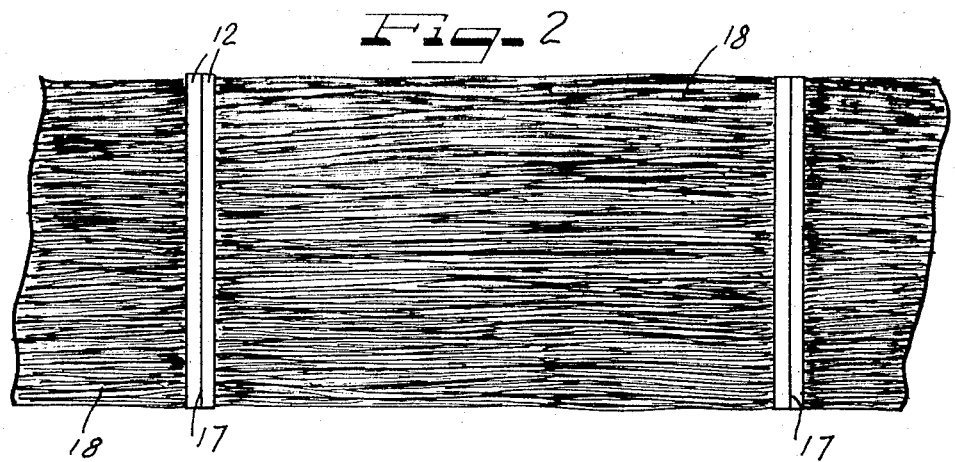

United States Patent [19]
Duescher

[11] 3,864,864
[45] Feb. 11, 1975

[54] FISHING LURE COMPONENT
[75] Inventor: Margie F. Duescher, St. Paul, Minn.
[73] Assignee: FisHair Incorporated, St. Paul, Minn.
[22] Filed: Nov. 2, 1971
[21] Appl. No.: 194,933

[52] U.S. Cl............................. 43/42.25, 43/42.53
[51] Int. Cl............................................ A01k 85/08
[58] Field of Search............ 43/42.25, 42.28, 42.53; 156/177, 178, 179, 180, 181, 72; 161/92, 93, 156/58, 72, 170

[56] References Cited
UNITED STATES PATENTS

| | | | |
|---|---|---|---|
| 1,640,599 | 8/1927 | Conn | 156/180 |
| 2,161,094 | 6/1939 | Saunders, Jr. | 43/42.28 |
| 2,563,825 | 8/1951 | Ebert | 43/42.53 |
| 3,017,307 | 1/1962 | Halliburton | 43/42.53 |

Primary Examiner—Warner H. Camp
Attorney, Agent, or Firm—Hill, Gross, Simpson, Van Santen, Steadman, Chiara & Simpson

[57] ABSTRACT

Heat-fusible hair-like fibers, disposed as a tow in a flat manner, are provided a narrow common bond by being thermally fused together transversely to the direction of the tow, such fused bonds being provided at increments along the length of the tow to sever such increments from the tow, the bonds being split lengthwise of the bonds and the increments being mechanically severed intermediate the bonds to provide flat bundles of hair-like fibers whose strands lie in a generally common direction and which strands have a narrow common bond at only one end. The bond is brittle and the user is readily enabled to separate a portion of the fibers as a unit from the article for use, for instance as a fishing lure component.

1 Claim, 3 Drawing Figures

PATENTED FEB 1 1 1975

3,864,864

FISHING LURE COMPONENT

BACKGROUND OF THE INVENTION

This invention pertains to a new article of commerce, and more specifically to a component for use in making a fishing lure.

PRIOR ART

It has been known heretofore in the making of fishing lures to utilize hair around a barbed hook. Such hair has either been natural or synthetic and must be tightly secured to the shank of the hook near the eyelet thereof. It has thus been known to begin with a tow of hair or synthetic fiber in bulk, to cut the fiber to length, to separate from the tow such quantity of hair as is needed for particular lure, and after the hair has been fastened to the lure, to trim excess hair therefrom as by a scissors, and for safety, a cement was frequently thereafter affixed.

For economic reasons, since natural hair is expensive and its supply is decreasing, it has been preferable to utilize synthetic fiber, but it has been observed that synthetic fibers tangle easily, are hard to untangle, tend to be clingy due to static electricity, are slippery and hard to grasp firmly, and are often hard to cut by a scissors except when very few strands are used.

SUMMARY OF THE INVENTION

The present invention is directed to an inexpensive article of commerce, which may be used as a fishing lure component by a fishing lure manufacturer wherein the component comprises a substantially flat bundle of hair, preferably a synthetic hair-like fiber that has the physical properties of "Dynel," the strands of which bundle lie in a generally common direction, and the strands having a narrow common bond at only one end thereof provided by a thermal fusion of the ends of the strands of hair and the bond being brittle. The bond is formed by a heated bar that simultaneously forms the bonds end-for-end of two such articles, the heat being applied through a coating of material having the physical properties of tetrafluoroethylene.

Accordingly, it is an object of the present invention to provide a new article of commerce.

A further object of the present invention is to provide a fishing lure component.

A still further object of the present invention is to provide a bundle of hair-like fiber which will store well without tangling.

Another object of the present invention is to provide a bundle of hair-like fiber wherein portions can be readily selected as a unit from a larger quantity of such fiber, the unit being of selected size.

Many other advantages, features and additional objects of the present invention will become manifest by those versed in the art upon making reference to the detailed description and the accompanying sheet of drawings in which a preferred structural embodiment incorporating the principles of the present invention is shown by way of illustrative example.

ON THE DRAWINGS

Figure 1:
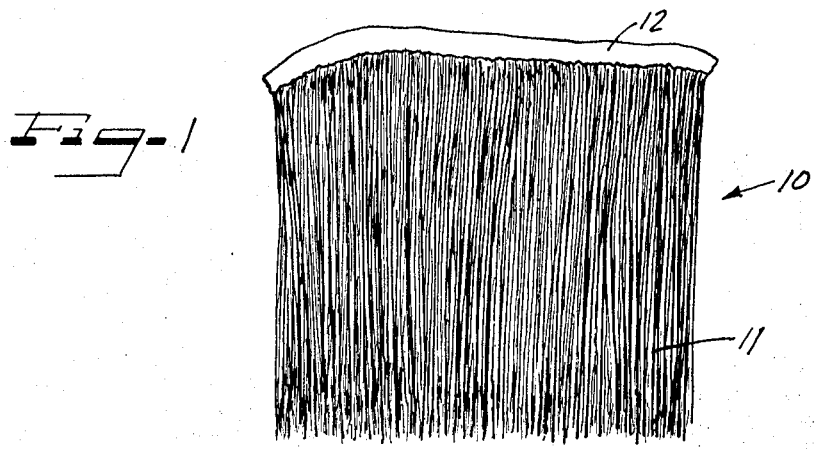
Figure 3:
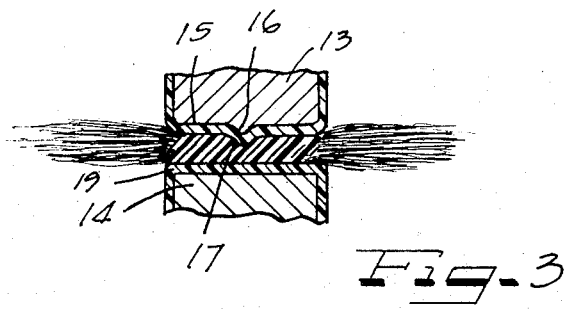

FIG. 1 is an elevational view of an article, such as a fishing lure component, provided in accordance with the principles of the present invention; and FIGS. 2 and 3 illustrate the method of making the article of FIG. 1.

AS SHOWN ON THE DRAWINGS:

The principles of the present invention are particularly useful when embodied in an article such as shown in FIG. 1, generally indicated by the numeral 10, and here constituting a fishing lure component. The article 10 comprises a substantially flat bundle of hair 11 whose individual strands lie in a generally common direction, the strands having a narrow common bond 12 at only one end thereof. In a preferred embodiment, the hair 11 is thermally fusible and to that end constitutes synthetic hair-like fiber that has the physical properties of "Dynel," "Dynel" being a trademark owned by Union Carbide Company and used to identify modacrylic fiber formed from vinyl chloride and acrylonitrile materials. It is believed the EURLA fiber is equivalent, EURLA being a trademark owned by Monsanto Chemical Company. Nylon is another substitute material.

The bonds 12 are formed in adjacent pairs by taking a substantial length or tow of heat-fusible hair-like fibers and disposing them in a substantially flat manner. Then the tow is advanced by an increment that represents twice the length of the hair or fibers 11 desired for one article 10. In a preferred method, a heated bar 13 that spans the tow then pinches the two against a heated backup member 14. The bar 13 and member 14 have a temperature sufficient to cause the individual hair-like fibers to fuse together into a common but weak mass, and to prevent such mass from sticking to the bar 13 and member 14, the heat preferably is applied through layers of tetrafluoroethylene 15, 19 carried by the bar 13 and member 14. Preferably the bar 13 has a central ridge 16 running along its length to form a line of reduced thickness 17 that extends centrally along the fused area, and while the fusing takes place, shrinkage occurs at the line 17 so that two spaced bonds 12 form whereby one increment of hair 18 is automatically severed from the tow by said material shrinkage, the bonds being then permitted to cool. On cooling, the bond 12 tends to take a rather irregular shape such as shown in FIG. 1, which is not of any consequence and which at times can even be used to provide an unevenness in the length of the hair 11 if such is desired. The increment 18 of hair between two of the bonds 12 is thereafter centrally cut by any mechanical means that does not cause thermal fusion to provide two articles such as shown in FIG. 1.

After the bond 12 has been permitted to cool to room temperature, it becomes very brittle but has sufficient strength to enable ready handling, such as for storage, and such as for further processing of the free ends, not a part of this invention. Yet, the bond can be easily fractured transversely to the length of the bond, namely parallel to the direction in which the hair 11 extends, so as to enable the user to readily select the exact quantity of hair 11 that he wishes to utilize in the lure being manufactured.

The resulting bundles or articles 10 store well without tangling of the hair, and the problems enumerated above under "Prior Art" are eliminated for the lure manufacturer. Fly tyers find it easier to work with the bundles or articles 10 than to work with natural hair.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. An article of commerce, for future use as a plurality of fishing lure components, comprising:
    a bundle of synthetic thermoplastic hair whose strands lie in a generally common direction, said strands having a narrow common bond of the hair at only one end thereof of such thickness to comprise a brittle fusion of the ends of only synthetic hair, said fusion being elongated transversely to said common direction and being manually fracturable in said common direction to provide individual lure components each having a selected quantity of hair at least temporarily supported only by the fusion.

* * * * *